United States Patent [19]

Katz et al.

[11] 4,446,095

[45] May 1, 1984

[54] METHOD FOR MANUFACTURING HEAT SHRINKABLE TUBING

[75] Inventors: Carlos Katz, Edison, N.J.; Amicam C. Zidon, Yorktown, N.Y.

[73] Assignee: Cable Technology Laboratories, Inc., New Brunswick, N.J.

[21] Appl. No.: 410,443

[22] Filed: Aug. 23, 1982

[51] Int. Cl.³ ............................................. B29C 13/00
[52] U.S. Cl. ..................................... 264/558; 264/26; 264/230; 264/565; 264/567
[58] Field of Search ................. 264/26, 230, 558, 564, 264/565, 567

[56] References Cited

U.S. PATENT DOCUMENTS

| | | | |
|---|---|---|---|
| 3,554,999 | 1/1971 | Shaw et al. | 264/558 |
| 4,056,596 | 11/1977 | Pahl | 264/26 |
| 4,071,597 | 1/1978 | Karabedian | 264/230 |
| 4,092,382 | 5/1978 | Heckman et al. | 264/230 |
| 4,172,873 | 10/1979 | Spicer | 264/230 |
| 4,227,293 | 10/1980 | Taylor | 264/230 |
| 4,304,616 | 12/1981 | Richardson | 264/230 |

Primary Examiner—Donald E. Czaja
Assistant Examiner—W. Thompson
Attorney, Agent, or Firm—Darby & Darby

[57] ABSTRACT

Long lengths of a heat-shrinkable sleeve for use in splicing electrical cables and the like are made in a continuous process. The sleeve is formed around a permeable core, and the core and sleeve are advanced together in an axial direction, the leading end of the advancing sleeve being hermetically sealed. The core and sleeve pass through a heating station, thereby heating a portion of at least the sleeve, and a fluid is introduced under pressure into the core, thereby internally pressurizing the sleeve to effect a radial expansion of the heated portion thereof. The core and sleeve then pass through a cooling station, thereby cooling the expanded sleeve to stabilize it. A stress graded compound also for use in splicing electrical cables and the like is made by heating a dimethyl silicone liquid to remove entrapped gas and mixing the liquid with a silicone carbide powder having a particle size capable of passing through a 400 mesh screen. The volumetric proportion of powder to 1 part liquid is within the range of 0.5 part to 2.0 parts.

13 Claims, 5 Drawing Figures

METHOD FOR MANUFACTURING HEAT SHRINKABLE TUBING

BACKGROUND OF THE INVENTION

The present invention relates to the splicing or joining of electrical cables and, more particularly, to a novel, continuous method of manufacture of a shrinkable composite sleeve used in forming a splice or joint, to apparatus for practicing the method, to a novel, highly effective stress control material compatible with the semiconductive components of the sleeve and of the cable for which the splice or joint is provided, and to a method of manufacturing the stress control material.

A copending U.S. patent application of George Bahder Ser. No. 319,429, filed Nov. 9, 1981, and assigned to the assignee of the present invention, discloses a new type of splice or joint especially adapted for splicing high-voltage power cables. The joint comprises a shrinkable, composite sleeve and high-resistive stress control components of which one is an integral part of the composite sleeve and the other is a separate layer of high electrical resistivity and mechanically resilient characteristics.

Said patent application Ser. No. 319,429 discloses a method of producing the shrinkable sleeve in a sequence of separate operations. Specifically, the three-layer polymeric composite sleeve is manufactured in one or more extrusion and curing passes over a metallic core. In a subsequent, completely separate process, the previously hardened sleeve is chopped into small lengths which then are placed into separate cylindrical containers. One of the ends of the sleeve is sealed, internal pressure is applied by introducing a pressurized fluid through the other end, and the sleeve is heated in a temperature sufficient to allow for the softening and expansion of the sleeve. Subsequently, the expanded sleeve is cooled to room temperature. Since the ends of each sleeve have to maintain their original dimensions, in order not to loosen the seals, the sections of sleeve being set up for expansion have to be significantly longer than the useful length of the sleeves. Subsequently, a significant part of the total length is discarded, since only the part having uniform expanded dimensions is useful.

The nonuniform expansion along the length of sleeve requires careful control of the process. In particular, the timing for pressure application during the heating step becomes critical, in order to minimize cracks and voids.

SUMMARY OF THE INVENTION

One object of the present invention is to provide a method of manufacturing long lengths of a heat-shrinkable sleeve for use in splicing electrical cables and the like, wherein no danger of voids and/or cracks forming in the body of the sleeve exists. In particular, an object of the invention is to provide a process which enables the manufacture of a three-layer expanded sleeve in one continuous operation, which reduces substantially the overall effort required, and which ensures the high quality of the expanded composite sleeve with practically no waste.

Another object of the invention is to provide an improved mixture for manufacturing a stress graded compound for splicing electrical cables and the like and a method of manufacturing the compound.

The foregoing and other objects are attained in accordance with the present invention by a process with a number of significant characteristics:

(a) Long lengths of a multi-layer composite sleeve are manufactured and applied over a core that allows for internal fluid pressure application. This manufacture employs an insulating material having thermoset characteristics resulting from crosslinking.

(b) The leading end of the sleeve is hermetically sealed, and fluid pressurizing means is attached to the other end of the length (which may be thousands or tens of thousands of feet away).

(c) The composite unexpanded sleeve is fed to the expansion system by means of a constant speed supply device.

(d) The metallic part of the inner core is rapidly heated by induction, and immediately afterward or simultaneously heat energy is supplied to the insulation system by passing the sleeve through a specially sized, relatively long heating pipe.

(e) The sleeve is expanded by internal pressure in a conical section of the heating pipe.

(f) The expanded sleeve is cooled in two steps, the first in an externally cooled pipe and the second under pressurized water, with a pressure which is less than the expansion pressure.

(g) The expanded sleeve is dried and wound up in a continuous length on a drum.

(h) The metallic conductor is removed from the sleeve and cut into lengths suitable for joining of power cables.

Manufacture of the stress graded compound comprises the steps of heating a dimethyl silicone liquid to remove entrapped gas and mixing the liquid with a silicone carbide powder having a particle size capable of passing through a 400 mesh screen, the proportion of powder to 1 part liquid by volume being within the range of 0.5 part to 2.0 parts. Preferably substantially 1 part powder to 1 part liquid by volume is employed. The heating can be done in an evacuated environment or in air. If it is done in air, then fumed silica is preferably added to the mixture in an amount sufficient to increase the viscosity of the mixture to a satisfactory value.

BRIEF DESCRIPTION OF THE DRAWING

A better understanding of the invention may be gained from a consideration of the following detailed description of the preferred embodiments thereof, in conjunction with the appended figures of the drawing, wherein.

DESCRIPTION OF THE PREFERRED EMBODIMENTS

The initial manufacture of a multi-layered sleeve such as 10 (FIGS. 1-3, where sleeve is shown as a single layer, for convenience) over a stranded conductor is a standard procedure, similar to that used in the manufacture of high voltage cables, wherein a polymeric conductor shield is applied over a metallic core, a relatively heavy layer of insulation is applied over the polymeric conductor shield, and over all an insulation shield is applied. However, in the case of the sleeve 10 it is a requirement that the internal surface be as smooth as possible, and a binder is therefore applied over the stranded conductor, as for example, one or more layers of tape. These tapes can be, for example, synthetic films such as polyethylene terephthalate. In addition, the characteristics of the inner shield are quite different from those of the conductor shield of a cable.

The inner layer of the sleeve 10 should normally have high resistivity or have a relatively high dielectric constant as compared to the dielectric constant of the cable insulation. For example, a dielectric constant above 5 is suitable. It also should be of thermoset nature. The insulation of the sleeve 10 can be any of a variety of thermoset dielectrics used in the manufacture of cables.

This insulating material may be selected in accordance with the ultimate application of the sleeve in joining cables of different types. For example, it may be beneficial in some situations to use the same insulating material in the joint as in the cable. Materials such as crosslinked polyethylene, ethylene propylene rubber or other thermoset insulations are suitable. Finally, the insulation shield should also be of a thermoset nature, and it should have semiconducting qualities similar to those used in the insulation shielding of cables.

The use of a stranded conductor or radially perforated thin tube is desirable since internal pressure has to be applied to the inner surface of the three-layer composite sleeve 10 in order to achieve its expansion. This pressure may be lower than 30 atmospheres.

Figure 1:
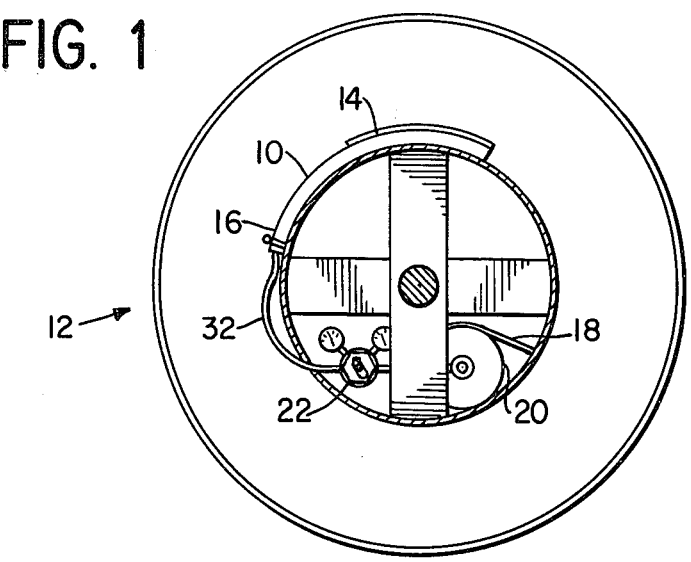
FIG. 1 is a view in end elevation, partly in section, of a pay-off or processing reel for supplying a long length of a sleeve in a first continuous process according to the invention.

The above-described, non-expanded composite sleeve 10 is put up on a pay-off or processing reel 12 provided with a side opening 14, as illustrated in FIG. 1. The inner end 16 of the sleeve 10 is pushed through this opening 14. The reel 12 to be used in the processing of these sleeves 10 is provided with means 18 to support a container 20 of pressurized fluid, such as pressurized dry air, nitrogen or any other suitable fluid. Alternatively, a compressor can be employed. The fluid container 20 is provided with pressure regulating means 22.

Figure 2:
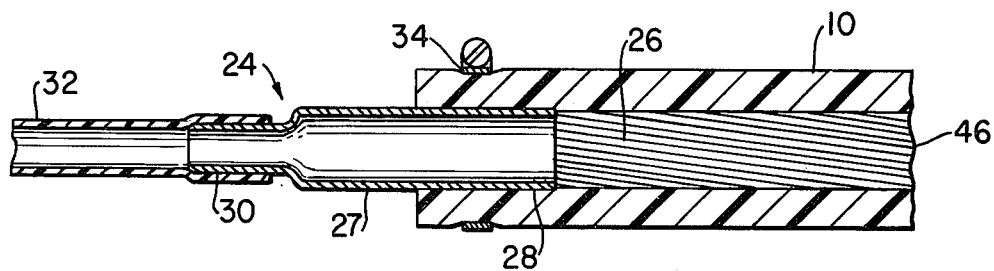
FIG. 2 is a view in axial section of a sleeve connected to means for pressurizing it internally in accordance with the invention.

The end 16 of the sleeve 10 (innermost part on the reel 12) is provided with suitable connecting means 24 to apply pressure (as illustrated in FIG. 2) to the inner part 26 of the sleeve 10. The connecting means 24 comprises a pipe 27 of which one end 28 is inserted within the sleeve 10 and the other end 30 is inserted within a tube 32 connected through the pressure regulator 22 to the fluid supply 20. A clamp 34 ensures a tight fit between the tube 10 and the pipe 27. The pressurized fluid container 20 rotates together with the reel 12.

Figure 3:
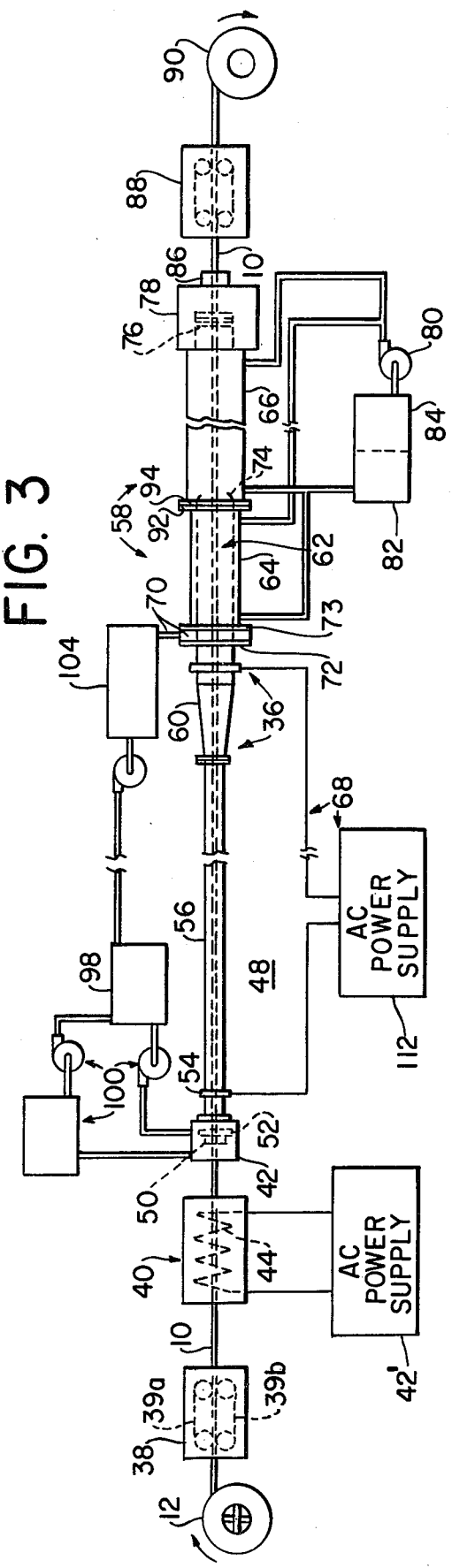
FIG. 3 is a diagrammatic representation of the apparatus of FIGS. 1 and 2 plus additional apparatus for carrying out the method of the invention.

FIG. 3 illustrates the equipment used in a first manufacturing process according to the invention. The sleeve 10 is supplied from the pay-off reel 12 to the heating-expansion-cooling section 36 of the process equipment by means of a control speed device 38 known in cable manufacturing as a metering capstan. The capstan 38 includes opposed treads 39a and 39b.

The sleeve 10 passes through an induction heating device 40 located between the metering capstan 38 and a lubricant seal box 42. This induction heating device 40 comprises an AC power supply 42 and a coil 44 electrically in series therewith and makes it possible to bring up rapidly the temperature of the metallic conductor 46 (FIG. 2) within the sleeve 10 by electromagnetic energy. The energy induced in the conductor 46 is controlled so as not to exceed the temperature at which the thermoset insulation system is degraded. Temperatures should normally be kept below 300° C.

Thereafter the composite sleeve 10 enters into a further heating section 48 of the system. This heating section 48 is provided with the following components in the direction of the sleeve movement:
 (a) the lubricant seal box 42
 (b) a lubricant seal device 50
 (c) a lubricant supply entry 52
 (d) an electrical heating clamp 54
 (e) a heating tube 56

The heating tube 56 extends from the inside of the lubricant sealing box 42 and continues to a cooling pipe or tube 58. The heating tube 56 includes immediately upstream of its downstream end a conical, or more properly a frusto-conical, expanding or expansion section 60.

Shortly downstream of the end of this conical expanding section is the cooling pipe 58. The first part 62 of the cooling pipe 58 has a cooling mantle 64. This is followed by a second cooling section 66, where cooling liquid is applied directly to the expanded sleeve. The electrical AC heating circuit 68 heats only the tube 56 and terminates upstream of the cooling section 58. In FIG. 3 it terminates immediately before the cooling section, but it may also terminate prior to the expansion section 60. The lubricant circulating system of which the upstream end (with respect to the movement of the sleeve 10) is in the lubricant seal box 42 may terminate downstream in the first section 62 of the cooling tube 58. In FIG. 3 a lubricant exit system 70 is provided at the flanges 72, 73 joining the heating tube 56 and the first section 62 of the cooling pipe 58.

A lubricant seal 74 is provided at the end of the first cooling section 62. The pressurized cooling pipe 66 terminates in a water seal 76 located inside a water seal box 78. The cooling system incorporates a pressurized water circulating system including a pump 80, a heat exchanger 82 and a storage tank 84. Downstream of the water seal box 78 the expanded sleeve 10 (not drawn to scale) proceeds into a drying section 86 and through a pull-out capstan device 88 from where it continues to a sleeve take-up 90. The equipment utilized downstream of the pressurized cooling pipe 66 is standard power cable manufacturing equipment.

The heating-expanding section 56, 60 and first section 62 of the cooling pipe are integral parts of one continuous pipe system. In the section 56, the sleeve is allowed to expand to the diameter of the pipe, which is calculated to have at least a diameter equivalent to the diameter of the sleeve without internal pressure, but expanded to a larger than original diameter in accordance with the coefficient of thermal expansion of the sleeve insulation system; for example, in the case of cross-linked polyethylene (XLPE) this radial expansion may be up to 15% of the diameter of the sleeve prior to entering the induction heating coil 44. The maximum diameter depends on the insulation system thickness and the maximum temperature the sleeve 10 is subjected to. The diameter at the end of the expansion section 60 of the pipe is calculated in accordance with the following formulae:

$$Z=[(D^2-d^2)K+(AK)^2]^{\frac{1}{2}}+2\delta \qquad (1)$$
$$K=(t_m-t_o)k \qquad (2)$$

where:

$Z$ = Inside diameter of the pipe 60 at the end of the expansion section $D$ = Outside diameter of the unexpanded sleeve 10 at room temperature $d$ = Inside diameter of the unexpanded sleeve 10 at room temperature $A$ = Largest diameter at room temperature over which the sleeve 10 has to fit plus clearance for eccentricity and $\delta$ = Thickness of lubricant film $k$ = Coefficient of volumetric expansion per °C. of the polymer used in the insulation system $t_m$ = Maximum temperature in °C. to be achieved in the heating pipe and $t_o$ = Room temperature As mentioned, the expansion section 60 is followed immediately by a cylindrical section 62 provided with a cooling mantle 64. At the downstream end of the cooling mantle 64, a flange 92 is provided which facilitates attachment of the mantle 64 to a flange 94 of the pressurized cooling pipe 66. The seal 74 minimizes the entrance of lubricant into the pressurized cooling section 66.

The lubricating liquid in the heating-expanding section 56, 60 and first section 62 of the cooling pipe provides simultaneously a means to lubricate the sleeve 10 and facilitate its movement through the system and to transfer heating energy into and from the sleeve 10. The lubricant circulating system comprises a lubricant reservoir 98 provided with heaters to bring the temperature of the lubricant to the maximum temperature the sleeve will be exposed to. The system includes pumping, pressurizing and flow control equipment 100. The lubricant is introduced into the heating pipe at the same end as the sleeve through a circular entrance 52. It is removed from the heating- expansion pipe 56, 60 by the circular exit 70 located close to the end of the expansion section 60. From here the lubricant moves by gravity (FIG. 3 is diagrammatic) to a collecting reservoir 104 from where it is pumped back into the supply reservoir 98. The whole lubricating system is closed.

Lubricants suitable for this operation are of the high molecular type, for example polyalkylene glycol such as UCON HB-5100, or dimethyl silicone fluids or polyhydroxy alcohol such as glycerol, entectic salts or other liquids of similar characteristics, providing simultaneously high molecular weight, good high temperature heat transfer and good lubricating characteristics. The high molecular weight characteristic is required in this operation to prevent the penetration of the liquid into the mass of the composite sleeve 10 and especially into the semiconducting layer, where it could affect adversely the electrical conducting characteristics of this layer.

Figure 4:
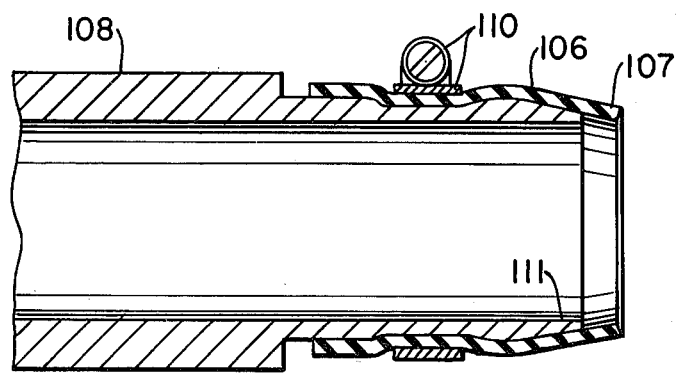
FIG. 4 is an enlarged view in axial section of a type of elastomeric seal useful in the apparatus of FIGS. 3 and 5.

The pressurized lubricant in the heating-expansion tube 56, 60 is prevented from exiting easily from this tube by means of seals. Elastomeric seals such as the one illustrated in FIG. 4 are suitable for this purpose; also labyrinth or other types of seals can be used. In FIG. 4 the elastomeric seal is formed by a sleeve 106 extending beyond a cylindrical, conical metallic pipe 108 and is held in place by a circular clamping device 110. The external pressure exerted by a fluid medium on the seal provides the required sealing pressure. The support pipe 108 and the seal are dimensioned so as to allow a close tolerance to the diameter of the cylindrical object passing through it. The flexible part 107 of the seal 106 extending beyond the conical end 111 has to be of longitudinal dimensions such that the radial force exerted on it is less than the longitudinal pulling force. In the case of the seal 74 (FIG. 3) installed at the exit end of the mantle 64 the required pressure to hold the lubricant inside the first section 62 of the cooling pipe is provided by the pressure of the cooling water within the pipe section 66.

The electric system for the heating of the composite sleeve passing through the pipe 56, 60 is provided by an A.C. power supply 112. The current to be supplied must be of such magnitude as to enable heating of the pipe to a maximum temperature of about 400° C., which is substantially above the softening temperature of the composite sleeve to be expanded in the system. For example, XLPE softens sufficiently for expansion at about 120° C. The temperature to be used may vary depending on the insulation used in the composite sleeve to be expanded. A.C. current is preferred for this heating system because it is the most effective, taking advantage of the skin effect of the pipe. The skin effect concentrates a higher density of current in the outermost part of the pipe, resulting in a higher and faster temperature rise. D.C. current or other means for heating these pipes such as heating mantles, resistor heaters, etc., can also be used.

It is important that the heating energy be transmitted effectively, rapidly and uniformly into the sleeve to be expanded. The length of the heating section is calculated in accordance with the characteristics of the sleeve to be expanded. Factors to be considered are the speed with which the sleeve is pulled through the heating pipe, the wall thickness of the sleeve insulating system, the dimension of the supporting core and the efficiency of the heat transfer medium. The expansion section 60 of the pipe is located at a sufficient distance from the entrance to allow the entire wall to reach the minimum softening temperature. Typical lengths are 50 ft. (about 15 meters) for the heating section 56, 2 ft. (about 0.6 meters) for the expansion section 60, 30 ft. (about 9 meters) for the first cooling section 62, and 50 ft. (about 15 meters) for the second cooling section 66.

The expansion section 60 must be of relatively short length which, however, is sufficient to allow for a gradual expansion of the sleeve 10. The angle formed by the axis of the pipe 56, 60 and an extension of the wall of the frustoconical pipe 60 (defined as the conical angle of expansion) is less than 60° and preferably less than 30° but greater than 10°.

As mentioned earlier an induction heating device 40 is located between the metering supply 12, 38 of the sleeve 10 and the heating section 56, 60 of pipe. This induction heating device 40, which is used for rapidly increasing the temperature at the inside of the sleeve, can, however, be an integral part of the heating pipe 56, 60. In this case, the section on which the induction coil is mounted is fabricated from an insulating material. It is desirable that this pipe not restrict to any significant degree the passage of electromagnetic energy to the inner metallic core 46 (FIG. 2) of the sleeve 10. When the heating device 40 is installed as an integral part of the heating pipe 56, 60, its location can be any point between the upstream end of the pipe 56 and the expansion section 60.

As mentioned earlier a lubricant sealing box 42 is located at the entrance to the heating pipe 56. The purpose of this lubricant sealing box 42 is to collect any lubricant which may leak out of the heating pipe by improper sealing of the elastomeric seal over the sleeve 10 being fed into the heating pipe. Such leaks may be due, for example, to lack of roundness of the sleeve. The sealing box 42 may be of a construction similar to that used for water seals in extrusion lines. This box 42 is connected to the lubricant supply system.

Also, as indicated earlier, at the end of the expansion pipe 60, a first section 62 of the cooling pipe 58 is installed. This cooling pipe 58 has at its upstream end an interior diameter equal to the downstream end interior diameter of the expansion pipe 60. This diameter can be constant or it can become gradually smaller with the shrinkage of the expanded sleeve in the first cooling section 62. The length of this section 62 of the cooling pipe ensures that the outer part of the expanded sleeve 10 has reached a hard condition before passing to the pressurized cooling section 66. The length of this section 62 is preferably such that no further increase in diameter of the sleeve 10 will take place while passing through the subsequent cooling section 66. The lubricant sealing section 74 is located at the end of the section 62 of the cooling pipe. The cooling mantle 66 is connected to the cooling liquid supply system 80, 82, 84 which allows removal of the heating energy from the expanded sleeve without causing deformation or internal shrinkage voids.

The high pressure water cooling section 66 of the cooling pipe 58 has a construction similar to that used in the cooling of power cables and enables the application of a controlled maximum fluid pressure to the outside of the expanded sleeve 10 which is about the same as the fluid pressure applied to the inside of the sleeve. The optimal length of this section 66 of the cooling pipe 58 is determined in accordance with the heat energy remaining in the sleeve and the speed at which the operation is executed. When the expanded sleeve leaves the cooling pipe, a temperature not greater than about 40° C. exists at the hottest point in the core. The direct contact between the cooling water and the expanded sleeve 10 provides for efficient heat transfer.

At the downstream end of the cooling pipe 66 a water seal 76 is provided. This water seal is incorporated into a water seal box 78 followed by a water dryer 86. After passing through this structure the expanded sleeve 10 passes through a pull-out capstan 88 and is wound onto a take-up reel 90. The internal pressure in the sleeve 10 is maintained throughout the operation, minimizing in this manner the formation of defects such as voids, cracks, etc. The stranded core 46 (FIG. 2) easily allows passage of the pressurizing fluid throughout the interior of the sleeve 10 from one end to the other. The pull-out capstan 88 is of such a nature as to minimize the deformation of the sleeve 10. Caterpillar pull-out capstans, as illustrated, are most suitable for this purpose.

At the completion of the sleeve manufacture, the metallic core 46 (FIG. 2) can be pulled out of the sleeve 10. The hardened, crosslinked sleeve 10 will maintain its shape until heated for shrinkage. The sleeve 10 can be used over any cable having an equivalent diameter larger than the original inside diameter of the sleeve 10. In use the sleeve 10 is cut into lengths as required by the cable joining operation.

Figure 5:
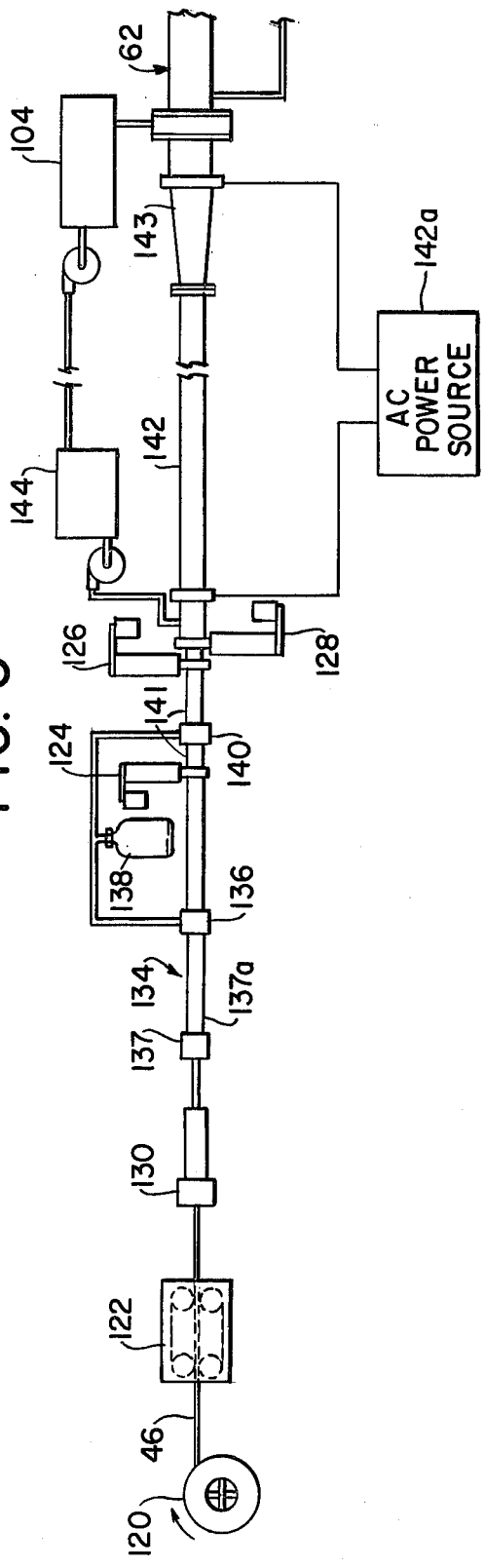
FIG. 5 is a diagrammatic representation of apparatus for carrying out a method according to the invention which is alternative to that described below in connection with FIG. 3.

In an alternative method of manufacture of the sleeves, illustrated in FIG. 5, the entire process of extruding the composite insulation system over a metallic core 46 and the curing, expansion and cooling are combined into one continuous operation with substantial reduction in costs and time of manufacture. Except for differences described below, the process of FIG. 5 is similar to that described previously in this disclosure.

In the case of FIG. 5, the metallic core 46 is supplied from a reel 120, through a metering capstan 122 to a set of three extruders 124, 126, 128. Shortly downstream of the metering capstan 122 a device 130 applies one or more binders (not shown) over the core 46. These binders are preferably of a high temperature resistant film or paper (not shown). The purpose of these tapes is to smoothen the inner sleeve surface. The tape is removed from the sleeve 10 together with the metallic core, before the sleeve is used in joining or splicing cables. The tape is preferably of a porous nature, such as cellulose or synthetic paper.

Upstream of the first extruder crosshead 124 a core pressurizing system 134 with a fluid entrance 136 and a seal 37 makes it possible to maintain internal fluid pressure in the hollow or stranded metal core 46. A pipe 137a surrounds the core 46, and the fluid introduced into the pipe from source 138 penetrates the tape applied by the device 130 and pressurizes the interior of the core 46. In the case where the extruders are arranged in tandem, the pressurization means 138 such as a tank or compressor supplies dry air or nitrogen to the outside of the layer extruded by the extruder 124 at a point 140 between the extrusion head 124 and the heads 126, 128. This pressure is regulated to be slightly higher than the pressure applied to the inner core and prevents blowout of the layer applied by the extruder 124. The pressure applied at 140 is contained within a pipe 141.

After the sleeve 10 leaves the last section of the extruder head in which the outer insulation shield is applied, it enters into a heating or curing pipe 142 having an interior diameter somewhat larger than that of the die of the downstream extruder 128. The inner diameter of this pipe 142 is calculated to allow for expansion during the crosslinking process which takes place while the sleeve 10 passes through the curing pipe. Heating means such as an AC power source 142a similar to the AC power source 112 (FIG. 3) is provided. The sleeve 10 is lubricated from its outside by means of a lubricating system 144 which feeds a lubricant liquid having a molecular weight high enough to provide molecules of a size incapable of penetrating into the semiconducting layer. The length of the curing pipe 142 is selected so that, when the insulating system reaches the end of the curing pipe, it has been fully crosslinked (cured). The pipe 142 may have to be longer than the previously described heating pipe 56, 60 or the speed of the process may have to be reduced.

In the process of FIG. 5 also, the cooling pipe 62 may have to be larger because higher temperatures than in the previous process may be used. In both processes, the cooling of the expanded sleeve is gradual. In the first cooling section 62, the sleeve 10 is hardened to the point that no further deformation thereof occurs when the sleeve comes into direct contact with the cooling medium of the second section 66 (FIG. 3). In the case of very thick sleeves, the temperature of the pressurization means in the second cooling pipe 66 may be reduced gradually from the point of sleeve entrance to the point of exit. The cooling means is pressurized at a pressure no greater than the pressure maintained inside the sleeve.

In FIG. 5, the application of the internal pressure is provided by the supply 138 of fluid (gas or liquid) through an entrance 136 located upstream of the first extrusion head 124. In order to minimize the loss of pressure the conductor 46 (FIG. 2) is supplied through the close-tolerance cylindrical pipe 137a, and, at the upstream end of this pipe, the seal 137 is provided.

Internal pressure is applied through the entrance 136 only after the initial curing of the sleeve 10 has been achieved and pre-selected dimensions are checked at the exit of the curing pipe (between curing and expansion pipes). This can be facilitated by providing one or more transparent portions or windows (not shown) at appropriate locations in the piping system. Before applying the internal pressure, the starting or leading end of the sleeve 10 is sealed to allow for maintaining with relative ease the internal expansion pressure. During subsequent usage, the sleeve may be shrunk back to an outside diameter equivalent to the inside diameter of the curing pipe 142. Immediately following the application of the internal pressure, the part of the continuous sleeve passing through the expansion section 143 of the curing pipe tends to attain the maximum diameter of this pipe section 143.

The above described process for the manufacture of shrinkable sleeves ensures a high consistency in quality by providing sleeves manufactured under very high curing and cooling pressures. This process also allows for the manufacture of joining sleeves for very high voltage cables having considerable wall thickness, which otherwise would be difficult and time consuming to manufacture. The high pressure utilized during both curing and cooling ensures the elimination of voids and microvoids in the insulation body.

Installation of the shrinkable joints in the field, as explained in said copending U.S. patent application Ser. No. 319,429, takes place after preparation of the cable for joining. First a resilient stress graded material is applied over the exposed cable insulation, and over this resilient stress graded layer the three-layer composite sleeve 10 is shrunk. Furthermore, a grease-like material is utilized for sealing the cable ends, to make them resistant to the penetration and longitudinal flow of moisture, which otherwise might work its way from the interface between the resilient stress graded material and the insulation into the mass of the insulation.

It has been found that commercially available resilient stress graded materials may affect the integrity of the high resistive semiconducting layer of the composite sleeve, by migration of liquid dielectrics such as oils or plasticizers utilized in the manufacture of the stress graded material. It has also been found that an alternative, novel stress graded compound overcomes this problem and at the same time constitutes a moisture seal that prevents penetration in the longitudinal direction along the interface of the newly developed compound and the adjacent extruded materials.

This newly developed composite is made of a dimethyl silicone liquid and silicone carbide powder having a particle size capable of passing through a 400 mesh screen. The two are mixed in a volumetric proportion of powder to 1 part liquid which is within the range of 0.5 part to 2.0 parts. Preferably, the ratio is 1 part of powder to 1 part of liquid by volume. In addition, fumed silica such as Cabosil by Cabot Corporation may be added to minimize the flow of this compound when heated to elevated temperature or when a low viscosity mixture is obtained because of the use of lower viscosity fluids.

In the manufacture of one version of the described stress graded material where fumed silica is not used, the silicone fluid is first brought to elevated temperature and subjected to an evacuation to remove any gas entrapped. Subsequently, the silicone carbide is added in a continuous mixing procedure during which an intimate contact between the two materials is obtained. The mixing, in a gas-free environment, avoids or minimizes the presence of voids in this composite material and improves the characteristics of the stress graded material. Mixing in an air environment, without evacuation, is also feasible. In this case fumed silica may be added. This process, however, requires the use of heavier thicknesses of the stress graded material to avoid the weakness introduced by voids or microvoids in its mass.

The application of these resilient compounds in the preparation of cable joints requires extruding a thin layer of compound, typically 20 to 30 mils thick, and applying this layer between two sheaths of disposable film, one of them to be removed just prior to application of the compound over the cable and the second one to be removed just prior to shrinking the composite sleeve over the joint. The characteristics of these disposable layers are such that they do not adhere permanently to the surface of the compound.

Because of their large molecular weight the dimethyl silicone fluids do not penetrate into the polymeric structure of the semiconducting resistive layer of the composite sleeve 10, and consequently they do not affect the original resistive characteristics of this layer. Because of this property, in addition to its moisture resistant characteristics and its resilience, so as to conform to any crevices in the polymeric interfaces and accommodate the dimensional changes occurring in the adjacent material during heating and cooling of the joint, it is well suited to the manufacture of power cable joints. It has also been found that the stress graded characteristics of the new mixture are as good as or better than those of other stress graded materials now available in the market.

Several tests have confirmed the advantages of using this new stress graded compound. Longitudinal dielectric strength tests performed with the new compound in a version made without fumed silica, applied a 5" long layer between two concentric layers of insulation. The voltage was increased 10% every 5 minutes. Breakdown occurred in one test at 95 kV and in another test at 100 kV. These values compare favorably with about 80 to 90 kV breakdowns obtained for commercially available stress graded material, tested under similar conditions. It has also been found that joints submerged in water with accelerating voltage aging conditions applied to them, without having any protection whatsoever to stop the flow of water into the area where the stress graded material is applied, are not affected by the presence of the water. This test has been conducted for three continuous months. In addition, tests have been conducted to establish whether the new compound will flow under high temperature conditions. No flow has been detected in spite of keeping the experimental joints in a vertical position cycling to 130° C. for 30 days.

It should be noted that the expansion process for sleeves described in this disclosure is also very suitable for the manufacture of cables with extruded insulation for use at cryogenic temperatures where it becomes a requirement, due to the dissimilar coefficients of contraction of the metal core and of the dielectric system, that extra radial space be provided between the interfaces of the metal and the insulation to prevent cracking of the insulation.

Thus there is provided in accordance with the invention a novel and highly effective method of and apparatus for manufacturing long lengths of a heat-shrinkable sleeve for use in splicing electrical cables and the like, and a novel and highly effective stress-graded compound to be used in such splicing. Many modifications of the preferred embodiments of the invention disclosed herein will readily occur to those skilled in the art upon considering this disclosure, and all such modifications are intended to be covered by the appended claims.

What is claimed is:

1. A method of manufacturing long lengths of a heat-shrinkable sleeve for use in splicing electrical cables and the like, comprising the steps of providing an elongated core and an elongated sleeve formed around the core, the core being permeable so that fluid within the core can flow along its length and can also escape from the core at a plurality of points along its length, advancing the core and sleeve together in a generally axial direction, hermetically seating the leading end of the advancing sleeve, passing the core and sleeve through a heating station, thereby heating a portion of at least the sleeve, introducing a fluid under pressure into the core, thereby internally pressurizing the sleeve to effect a radial expansion of the heated portion thereof, and passing the core and sleeve through a cooling station, thereby cooling the expanded sleeve to stabilize it.

2. A method according to claim 1 wherein the core is made of a magnetizable material and the heating includes the step of inducing an alternating current within the core.

3. A method according to claim 1 wherein the heating station includes a pipe surrounding the sleeve and the heating includes the step of passing a hot fluid through the pipe.

4. A method according to claim 1 wherein the cooling station includes a pipe surrounding the sleeve and the cooling includes the step of passing a cool fluid through the pipe in such a manner that the fluid avoids direct contact with the sleeve.

5. A method according to claim 1 wherein the cooling station includes a pipe surrounding the sleeve and the cooling includes the step of passing a cool fluid through the pipe in such a manner that the fluid makes direct contact with the sleeve.

6. A method according to claim 5 wherein the cool fluid is under a pressure greater than atmospheric and less than the pressure of the fluid introduced into the core.

7. A method according to claim 1 wherein the cooling station includes a pipe having an upstream region and a downstream region with respect to the advancing core and sleeve and the cooling includes the steps of passing a cool fluid through the upstream region in such a manner that the fluid avoids direct contact with the sleeve and passing a cool fluid through the downstream region in such a manner that the fluid makes direct contact with the sleeve.

8. A method according to claim 1 wherein the conical angle of said expansion is less than 60°.

9. A method according to claim 1 wherein the conical angle of said expansion is less than 30°.

10. A method according to claim 1 wherein the conical angle of said expansion is greater than 10°.

11. A method according to claim 1 wherein the advancing of the sleeve is at a uniform rate.

12. A method according to claim 1 wherein the providing of the core and sleeve comprises the steps of unwinding the core and sleeve from a reel and the advancing of the core and sleeve comprises the step of feeding the core and sleeve between opposed treads of a metering capstan drive.

13. A method according to claim 1 wherein the providing of the core and sleeve comprises the steps of unwinding the core from a reel and extruding the sleeve around the core and the advancing of the core and sleeve comprises the step of feeding the core between opposed treads of a caterpillar capstan drive.

* * * * *